United States Patent [19]

Wade et al.

[11] Patent Number: 4,830,868

[45] Date of Patent: May 16, 1989

[54] FRUIT SHAKE AND METHOD OF MAKING THE SAME

[75] Inventors: Bill R. Wade; Thelma L. Wade, both of Farmington, Wash.

[73] Assignee: Olympus Industries, Inc., Spokane, Wash.

[21] Appl. No.: 85,454

[22] Filed: Aug. 14, 1987

Related U.S. Application Data

[63] Continuation-in-part of Ser. No. 872,703, Jun. 6, 1986, which is a continuation-in-part of Ser. No. 681,248, Dec. 13, 1984, abandoned, which is a continuation-in-part of Ser. No. 759,821, Jul. 26, 1985, Pat. No. 4,609,561.

[51] Int. Cl.$^4$ .......................... A23G 9/00; A23L 2/02
[52] U.S. Cl. ..................................... 426/565; 426/599
[58] Field of Search ............... 426/565, 566, 567, 599, 426/804

[56] References Cited

U.S. PATENT DOCUMENTS

| | | | |
|---|---|---|---|
| 2,131,650 | 9/1938 | Webb | 426/565 |
| 3,862,342 | 1/1975 | Maraulja et al. | 426/599 |
| 3,922,361 | 11/1975 | Vann | 426/599 |
| 3,922,371 | 11/1975 | Julien | 426/599 |
| 3,949,098 | 4/1976 | Bangert | 426/599 |
| 4,235,936 | 11/1980 | Kahn et al. | 426/599 |
| 4,293,580 | 10/1981 | Rubenstein | 426/599 |
| 4,433,000 | 2/1984 | De Leon | 426/599 |
| 4,486,413 | 12/1984 | Wiesenberger | 426/599 |
| 4,609,561 | 9/1986 | Wade et al. | 426/565 |
| 4,724,153 | 2/1988 | Dulin et al. | 426/566 |

*Primary Examiner*—Jeanette Hunter
*Attorney, Agent, or Firm*—Oldham & Oldham Co.

[57] ABSTRACT

A fruit juice shake mix is provided which can be stored in bulk packages such as a gallon to several gallon containers or as individual essentially a single person quantity in unit packages of usually several to a dozen individual containers such as cans or rectangular cartons. The fruit juice shake mix may be blended in a freezer to incorporate air or frozen and then air blended in to give about 40 to about 150% overrun and a viscosity suitable to be drawn into the mouth by a straw.

9 Claims, No Drawings

FRUIT SHAKE AND METHOD OF MAKING THE SAME

CROSS-REFERENCE TO RELATED APPLICATIONS

This application is a continuation-in-part of application Ser. No. 872,703 filed June 6, 1986, which is a continuation-in-part of application Ser. No. 681,248 filed Dec. 13, 1984 now abandoned and Ser. No. 759,821, filed July 26, 1985, now U.S. Pat. No. 4,609,561.

TECHNICAL FIELD

The present invention relates to juice mixtures suitable for frozen shakes, to the method of making such shakes and to the shakes themselves.

BACKGROUND ART

There are fruit juice mixtures presently on the market that are suitable as frozen cream confections similar to ice cream or related novelties. Their nature is illustrated by applicant's U.S. Pat. No. 4,609,561, as well as by the patents cited in applicant's patent, i.e. U.S. Pat. Nos. 2,977,231 of Fox et al; 3,949,098 to Bangert; 4,293,580 to Rubenstein; and 4,551,341 of Blaine et al shows other close art.

U.S. Pat. No. 4,242,367 of Igoe describes how milk shakes may be made by resolving the problems occasioned by milk separating into so-called whey and related products, through use of blends of certain gums.

DISCLOSURE OF THE INVENTION

It is, therefore, an aspect of the present invention to provide a juice mixture especially adapted for making shakes having the relatively low calorie content of about 11 to 15 calories per fluid ounce that can be consumed with a spoon or a straw due to the fact that its viscosity in the frozen state is within the range of 50,000 to 400,000 cps units at about $-4°$ C. to $-5°$ C.

It is another aspect of the present invention to supply a shake mix that can be frozen to yield a consumable shake capable of being eaten with a spoon or a straw.

In general, a fruit juice mixture comprises at least one type of fruit juice; from about 0.05% to about 1.5% by weight of at least one stabilizer, based upon the total weight of said mixture, the stabilizer being derived from a natural souce, and in preferred formulations being at least partly xanthan gum; from about 0.05% to about 0.50% by weight of a soy protein or related protein, based upon the total weight of said mixture, the amount of remaining ingredients, including water, being such that said mixture has an overall brix value of greater than 15 to about 30, preferably 18 to 21, and the blend being free of sugar and corn sweetener additives. It is also desirable to decrease the flavoring agent to give levels about 10 to 50% lower than customarily used in soft pack formulations, and it is usually desirable to reduce acid levels to adjust the tartness by means of the well known, consumable acidulents.

BEST MODE FOR CARRYING OUT THE INVENTION

The juices useful in this invention are preferably natural ingredients. By natural ingredients is meant that the ingredients are obtained from a fruit, vegetable or edible plant by crushing, squeezing related operations. They may be filtered, strained, passed through a sieve, resin beds, clay or diatomaceous earth bed or filters, or ion exchange resins to give a juice, a juice concentrate, purees, and so-called modified juices. Although the fruit juice can be used to form mixtures which are frozen and edible as such, that is as a soft-serve, it is preferably in the practice of this invention to adjust the mixes so that they can be frozen in a cream form that can be consumed with a spoon or a straw as a frozen fruit shake. By frozen fruit shake is meant that the mix has a texture, appearance and taste similar to a regular commercial milk shake.

The shake mixtures of this invention contain at least one type of fruit juice preferably capable of yielding a mix of about 15 to 30 brix. Blends of various juices, as well as single juices, can be utilized, and blends are actually desired for many flavors. By the term fruit juice is meant any type of juice that is extracted from fruit by conventional means such as pressing. The juice itself contains various types of saccharides, preferably a majority of monosaccharides. Specific types of juices which can be utilized in the present invention include fruit juice, concentrated fruit juice, fruit puree, fruit puree concentrate, modified juices, as well as modified concentrated juices and the like. Modified juices, for instance, would include ion exchange treated and/or ultrafiltered juices, or deoderized and decolorized ones. Examples of a few of the many specific juices which can be utilized in the product of the juice mixture having a brix value of less than about 15 generally tends to be too sour, as well as to be too icy when frozen to make the shake less creamy and difficult to draw through a straw. A more desirable brix range is from about 18 to 20, with a range of about 18.5 to 19.5 being preferred. A brix value of approximately 19 has been found to be optimum for most juices. These brix values may be obtained without the use of the lactose, refined sugar, corn sweeteners or milk and eggs, used in making ice cream. it is highly desirable to use a blend of a high brix juice with a low brix juice—usually about 2 to 35% of low brix juice being present, when making certain flavors.

Stabilizers are used in the present invention to give body as well as good texture, consistency, stability and to improve stability of over-run and melt-down of the overall mixture. The stabilizers are preferably derived from natural sources such as plants and the like, although some of the stabilizers may be modified in order to render them stable, food-grade functional, or clean. Examples of stabilizers which are utilized and generally preferred in the present invention include guar gum, locust bean gum, and carrageenan. Especially preferred is xanthan gum since it gives less body and results in a lower viscosity of the mix, as well as superior air or gas emulsibility and greater stability, without undue iceness, but with sufficient ice at the specified brix value to be spoonable and straw consumable at the desired viscosity. In addition to the basic types of stabilizers listed, other types can be utilized such as, for example, various alginates, generally made from seaweed; various cellulose gums; various pectins, and the like. Such stabilizers are well known to those skilled in the art, as well as being mentioned in the literature. The stabilizers render the juice mix uniform and also tend to control the stability and the creaminess of the mixes when frozen, as well as their consistency or viscosity.

The stabilizers may be selected from a group consisting of guar gum, locust bean gum, xanthan gum, carrageenan, an alginate, a cellulose gum, a pectin, hydroxyethyl cellulose, hydroxypropyl cellulose, carboxymethyl cellulose, microcrystalline cellulose, amidated pectin, propylene glycol alginate, modified starches, maltodextrins, gelatin, polydextrose, hydroxypropylmetyl cellulose, methylcellulose, methylethyl ceullolose, ethylcellulose, and combinations thereof.

Conveniently, the juice type is selected from the group consisting of fruit juice, fruit juice concentrate, fruit juice puree, fruit juice puree concentrate, modified juice, and modified juice concentrate, with juice concentrates of 30 to 75 brix being highly desirable, and those from about 45 to 70 brix most preferred in making the single juice product, or juice blends with two or more juices.

The overall amount of said stabilizers usually may be from about 0.05% to about 1.50% by weight with preferable levels being from about 0.12% to 0.5%, by weight.

Preferably, the protein comprises a vegetable protein, such as soy protein or wheat protein, but the use of protein from animal products such as milk protein or egg albumen may also be envisioned.

The protein desirably is at a level of at least about 0.05%, based on the total weight of the mixture, with the upper limit being about 0.50%. A preferred range, however, is from about 0.07% to 0.25%, by weight.

The total amount of all stabilizers utilized is generally from at least about 0.05% to about 1.5%, with the desired range being about 0.12 to 0.50%, by weight, based upon the weight of the entire juice mix. Lesser amounts tend to result in separation of the various ingredients, whereas higher amounts tend to result in a very viscous mixture that is difficult to mix. Lesser amounts also tend to yield whipped aerated frozen shake products with weak body, coarse or icy consistency, and poor meltdown stability, while higher amounts tend to result in a gummy or elastic body, and unnatural meltdown qualities. If the amount of an individual stabilizer utilized is reduced, it is usually compensated for by the use of a similarly increased amount of another stabilizer, so that the overall amount generally remains about the same.

Another ingredient which is utilized is a vegetable protein such as soy protein. Generally, any modified type of soy protein can be utilized. The purpose of the soy protein is to improve and control the whippability of the fruit juice mix for frozen shakes. It thus enhances the ability of the over-run upon whipping of the frozen material to take up air, so that a creamier, milk shake-like appearance and consistency of the frozen shake is achieved. The amount of soy protein used is generally from about 0.05% to about 0.50%.

The amount of water will vary over a wide range, depending on the concentration of the juice mixtures to bring the product to the desired brix range.

Other ingredients which may be utIlized are natural flavors and/or spices to establish standardized optimum flavor levels for said flavor. Examples of natural flavors include nutmeg and cinnamon in small amounts such as from about 0.05% to about 0.07% by weight, and natural flavors derive from concentrates of essential oils, botanicals, essences and the like. For shake mixes, it is desirable that the flavoring levels be approximately 0 to 5%, by weight. Hence, the shake mixes frequently will contain from about 0.05 to 1.50% by weight of the flavoring ingredients. Naturally, other specialty type ingredients can also be utilized in similar amounts. Any natural flavoring ingredient can be used to make flavors, ranging from vanilla, chocolate, tropical fruits, pumpkin, to pizza, if desired.

Generally, small amounts of various flavor enhancers or modifiers, generally food grade acids, can be utilized to impart tartness, enhance flavor, prevent oxidation of the ingredients or the like. For example, citric acid and other organic acids such as malic acid may be utilized to impart tartness or accentuate the flavor of the mixture. The amounts of such acids generally are sufficient to give a pH of less than 4.4 but greater than 2, preferably above about 3.5, and even more preferably above about 3.8-4.0, and a total acidity level of about 0.15 to 0.80, measured as citric acid. In a preferred embodiment, the acidity level will be from about 0.40 to 0.60, measured as citric acid.

In order to prevent oxidation of the ingredients, commonly called browning, ascorbic acid can be utilized as in an amount from about 0.02 to 0.10 weight percent, and preferably from about 0.05% to about 0.08%, by weight, based upon the total weight of the overall fruit juice mixture.

These acids are also utilized to ensure that the pH of the mix is below pH 4, preferably from about a pH of 3.6 to 4.0 to provide microbiological control, and to reduce the tartness of the frozen shake. Another advantage is that generally lower processing temperatures can be utilized at these pH levels with aseptic processing of the mix, thus imparting less heat derived stress on the fruit juice system. The acids are also used to standardize the titratable acidity or tartness perception of the finished mix, as variations occur in raw material maturity. The titratable acidity is usually determined by titration with 0.1N NaOH to a phenolphthalien end-point, or with a pH instrument.

MIXING

The mixing procedure for forming the fruit juice shake mix is generally that described in our U.S. Pat. No. 4,609,561, and its related copending applications.

The shake mix may be refrigerated while awaiting containerization in suitable shipping packaging. Before packaging, the mix is deaerated with equipment such as a Dole Vacuum Deaerator at vacuums of 15 inch Hg, and then raised to commercial sterilization temperatures, about 173° F. to about 205° F. for about 2 minutes to about 8 seconds, before finally being cooled and aseptically packaged to await use, or shipment to the point where it will be frozen into a frozen shake. Alternatively, in what is generally called the hot pack system, the product is added to the container at about 173° F. to 205° F., and the closed container is cooled to storage temperature to await use of shipment.

The fruit juice shake mix can also be made at the freezing location and processed at either hot or cold temperatures, depending on the type of stabilizers used and the microbiological aspects of the mix.

At the freezing location, the juice is poured into a machine known to the ice cream trade as a shake making machine, either being gravity or pressure fed. Here it is cooled and frozen, as well as whipped with air or gas, to produce a frozen flavorable mixture having the characteristics of a shake. Whipping results in the generation of small, trapped bubbles in the shake, increasing its volume, and providing it with a texture that is appealing to the palate, and therefore, very desirable. The increase in volume thus achieved is known as "over-run", a doubling of volume equating to a 100% over-run. In the practice of the invention, it has been found that an over-run of from about 40% to 150% provides a superior shake product, but that an over-run of from about 70% to 120% is even more desirable. Those of ordinary skill in the ice cream trade will be able to propose other apparatus that could be used to process the juice mixes of this invention in making a fruit shake.

The invention will be better understood by reference to the following representative and illustrative examples, where all parts and percentages are by weight, unless otherwise designated.

EXAMPLE I

A sample of a shake (10.5 fluid ounces) made from a commercial, Vitari-type regular soft serve having a 70% over-run is drawn into a 16 fluid ounce paper cup, and 1.5 ounces of water is added. The paper cup is then placed under a commercial shake machine and mixed for about 30 to 60 seconds to whip in sufficient air to increase the volume to about 13 fluid ounces.

The shake has an over-run of about 90 to 100%, a viscosity 23°-24° F. (−5.0° to 5.5° C.) of approximately 100,000 25,000 cps, and a brix value of about 19.0 0.5, whereas the Vitari soft serve has a viscosity at 15° F. to 18° F. (−9.4° C. to −7.7° C.) in excess of about 500,000 cps, and a brix value of about 23 to 25. The fruit juice shake, having the appearance similar to a regular milk shake, has an excellent taste, and can be eaten by spoon or by straw.

EXAMPLE II

The ingredients of this example are mixed in four parts, according to the mixing instructions listed beneath each part of the following formula.

SHAKE MIX FORMULA

PART 1
| | |
|---|---|
| Water | 216.0 gal. |
| Ascorbic Acid | 2.2 lbs. |
| Concentrate, Apple Juice 70 BX DDR | 23.1 gal. |
| Puree, Peach 10 BX | 1,220 lbs. |
| Flavor, Peach #215 | 600 fl. oz. |
| Flavor, Peach #237 | 231 fl. oz. |
| Annatto, Hansen's | 32.0 fl. oz. |
| Beet Color, Hansen's - B-40 | 15.0 fl. oz. |

Add the water to the 500 gallon batching kettle. Dissolve the ascorbic acid in the water, and add the concentrates, flavor, puree and colors to the kettle. Turn on the agitator and mix thoroughly.

PART 2
| | |
|---|---|
| Concentrate, Apple Juice 70 BX DDR | 60.0 gal. |
| Xanthan Gum | 2.8 lbs. |
| Guar Gum | 8.3 lbs. |

Add the above amount of concentrate to a high-speed marshmallow mixer. Start the mixer; add the gums individually, and in the order listed. Blend until smooth. Then the rest of the ingredients are then to be added, as set forth in Part 3.

PART 3
| | |
|---|---|
| Water | 30.0 gal. |
| Soy Protein 520K | 7.7 lbs. |

Add the water and the protein to the mixture in the marshmallow mixer. Blend until smooth, and pump through a strainer bag into the batching kettle.

PART 4
| | |
|---|---|
| Water | 23.0 gal. |

Add the remaining water to make up a 500.0 gallon batch. Agitate 5–10 minutes. Take a sample for quality control.

The brix preferably should be 19.0 0.3; the pH should be 3.95 0.1, and the total acidity should be 0.48 0.03. The total acidity may be adjusted to the preferred range with malic acid to give 500 gallons of a peach flavored fruit shake mix.

A portion of the finished mix is placed in a commercial shake machine and frozen to about 23° F.–24° F. (−5.0° to −5.5° C.), with stirring to whip in sufficient air to give a 90 to 100%, by volume, over-run.

The frozen shake at these temperatures has a viscosity of about 100,000 cps, an excellent taste, and a consistency which permits it to be eaten with a spoon or through a straw. A satisfactory peach fruit juice shake is thus produced without milk, eggs, or added sugar.

EXAMPLE III

SHAKE MIX FORMULA

A STRAWBERRY FRUIT JUICE SHAKE MIX

The ingredients of this formula are mixed as detailed hereinafter for each part of the formula.

PART 1
| | |
|---|---|
| Water | 300.0 gal. |
| Malic Acid | 3.8 lbs. |
| Concentrate, Apple 70 BX DDR | 37.9 gal. |
| Puree Strawberry Seedless 7 BX | 224.0 lbs. |
| Flavor, Strawberry #825 | 12.5 gal. |
| Elderberry Extract | 218 fl. oz. |
| Ascorbic Acid | 1.1 lbs. |

Add the water to the 500 gallon batching kettle. Dissolve the malic acid in the water, and then add the concentrate, puree, flavor and colors to the kettle. Turn on the agitator and stir until well mixed.

PART 2
| | |
|---|---|
| Concentrate - Apple Juice 70 BX DDR | 60.0 gal. |
| Xanthan Gum | 2.8 lbs. |
| Guar Gum | 9.3 lbs. |

Add the 60 gallons of apple juice concentrate to the marshmallow mixer. Start the high speed mixer and add the gums individually, in the order listed. Blend until smooth before adding the water and protein listed below in Part 3.

PART 3
| | |
|---|---|
| Water | 35.0 gal. |
| Soy Protein 520K | 6.6 lbs. |

Add the 35 gallons of water and protein to the marshmallow mixer. Blend until smooth and then pump through a strainer bag into the batching kettle.

| PART 4 | |
|---|---|
| Water | 27.0 gal. |
| Malix Acid | 1.2 lbs. |

Add the remaining 27 gallons of water to the 500 gallon batch kettle, together with the malic acid. Agitate 5–10 minutes. Take a sample for quality control checks. Adjust T.A., i.e., total acidity, with the remaining malic acid as necessary to get a brix of 19.0 0.3%, a pH of 3.9 0.1, and a T.A. of 0.53 0.03 (w/w as citric acid), thus producing a strawberry fruit juice shake mix.

The product is frozen in a shake machine to provide about 100 15% over-run, and a viscosity of 100,000 50,000 cps units at about −4.5° C., a shake which is readily eaten with a spoon or a straw.

The frozen strawberry fruit juice shake of this formula have a mouthfeel similar to that of a regular all-milk shake at this brix and sweetness level, discrete ice crystals appear to be present, as well as the smooth texture and sweetness associated with an all-fruit juice frozen cream. Taste tests show the formula to yield a frozen all-fruit juice shake that would be agreeable to customers and which has properties of appearance, taste, feel and straw consumableness equivalent to the traditional milk-containing milk shake.

In these examples, about 18 to 40% of the high brix juices are used as concentrate, i.e., generally those of 45 to 75 brix, such as the deodorized and/or decolorized apple, grape, or pear juices, while about 2 to 23% of the low brix juice of about 5 to 15 brix are employed, to illustrate one type of the fruit flavored shake mixes of the invention.

Alternatively, a deodorized and decolorized high brix juice such as pear, grape, or apple may be used alone to make a satisfactory vanilla or chocolate shake and related flavors, since such juices may display superior taste qualities. However, the total acidity may then need to be lower than with a blend of two or more juices.

The viscosity values described in the preceding are with a Brookfield viscometer, Spindle T-F, Speed 6 with Heliopath attachment in a downward mode at the temperature indicated.

Another useful embodiment of this invention comprises taking about 6 to 20 fluid ounces of a fruit juice shake mix such as for example those of Example I, II or III or other similar or different flavored fruit juice shake mixes and package it in suitable individual packages viz a 4 to 6 or a dozen individual packages in a unit and market the total package as a unit. The purchaser could take each individual 10 to 20 ounce package from its storage in the freezer compartment of the refrigerator and place the contents in a mixer such as a Waring Blender to whip in sufficient air usually about 70 to 150% overrun to obtain a readily strawable frozen fruit shake that could be consumed either by spoon or straw. This will provide a new product which has not been heretofore available as individual packages of a fruit juice shake mix. Thus, the market would have so called "6-pack type" fruit juice shake mixes that could be stored frozen at home and be easily and efficiently mixed in a home blender to yield a consumable frozen fruit shake.

Thus it can be seen that the objects of the invention have been achieved by the teaching presented herein.

While in accordance with the patent statutes, only the best mode and preferred embodiment of the invention has been presented and described in detail, it is to be understood that the invention is not limited thereto or thereby. Accordingly, for an appreciation of the true scope and breadth of the invention, reference should be had to the appended claims.

What is claimed is:

1. A fruit juice shake consisting essentially of a frozen mixture, on a weight basis, of at least one type of fruit juice having a brix value greater than about 30 to about 75, about 0.05 to 1.5% of at least one stabilizer, about 0.05 to 0.5% of protein, sufficient flavoring agent or agents to give the desired flavor at the frozen over-run, and sufficient water to give a mix having a brix greater than about 15 and less than 30, sufficient added edible acid to give a pH of less than about 4.4 and greater than about 3.0, a total acidity of about 0.15 to 0.80, measured as citric acid, and a viscosity greater than 50,000, and less than about 350,000 cps units at about −4.5° C., and containing from about 40 to about 150% over-run in the frozen state.

2. The shake of claim 1, wherein however, at least one stabilizer is present in an amount of from about 0.12% to 0.50%, wherein, said mixture contains from about 0.07% to 0.25% of protein, and wherein, said pH is greater than about 3.5, and wherein further, said total acidity is from about 0.4 to 0.6, and wherein still further, said over-run is from about 70% to 120%.

3. The shake of claim 2 wherein one type of fruit juice is selected from among modified juices characterized as reduced color and odor grape, apple, pear and orange juices.

4. The shake of claim 3 wherein the modified juice constitutes from about 30 to 99% of the juice present, and the rest is a low brix juice of from about 5 to 15.

5. A fruit juice shake mix having a calorie content of from about 11 to 15 calories per fluid ounce, and comprised of a mixture containing at least one juice of high brix value, and at least one of low brix value, and from about 0.07 to 0.25% by weight fluid soluble protein, and containing sufficient water to give the mixture a brix value of greater than about 15 and less than about 25.

6. The fruit juice shake mix of claim 1 wherein at least one of the fruit juices is a deodorized and decolorized high brix juice of about 45 to 70 brix, and the remainder of the juice is a low brix juice having a brix value of greater than about 5 to about 15, and wherein the proportions of said juices are adjusted to minimize the amount of added water required to give the desired brix of about 18 to 20, and a frozen viscosity of about 75,000 to 200,000 centipoises at about 5.0° C. to 5.5° C.

7. The shake mix of claim 6 wherein the frozen shake has a calorie content of about 13 2 calories per fluid ounce.

8. The fruit juice shake of claim 1 packaged in at least an individual container of essentially a single personal serving amount, frozen and then mixed in a blender to incorporate sufficient air to yield an aerosol mix having about 40 to 150% over-run and a viscosity of 50,000 to 350,000 cps units at −4.5° C.

9. The fruit juice shake of claim 8 wherein the individual containers have a capacity of about 6 to 20 fluid ounces.

* * * * *